Nov. 7, 1967  J. W. BLAKE  3,351,404
ASH RECEPTACLE FOR AUTOMOBILES
Filed Jan. 24, 1966
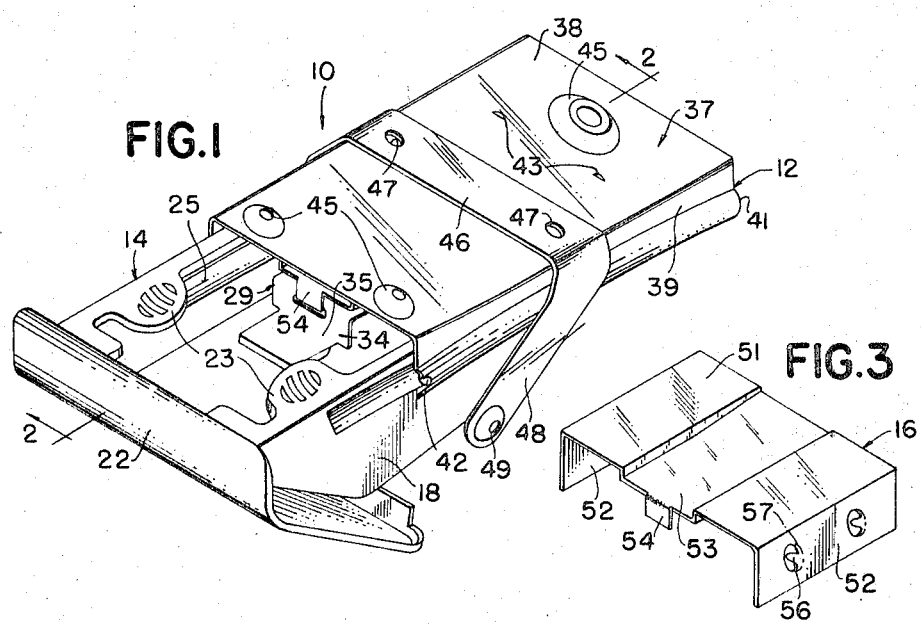
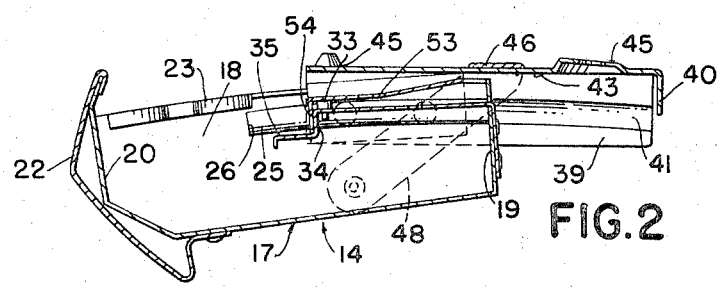
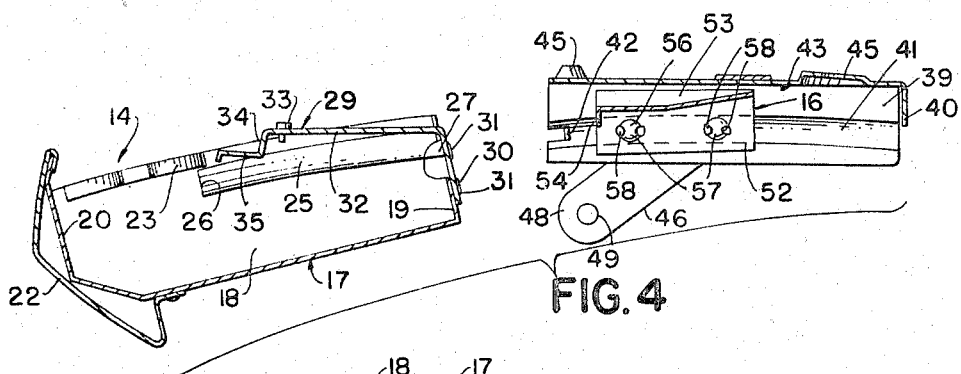
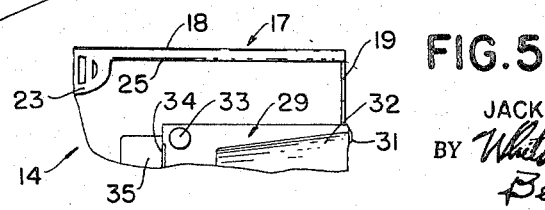
INVENTOR.
JACK W. BLAKE
ATTORNEYS

United States Patent Office 3,351,404
Patented Nov. 7, 1967

3,351,404
ASH RECEPTACLE FOR AUTOMOBILES
Jack W. Blake, Grand Rapids, Mich., assignor to F. L. Jacobs Co., Detroit, Mich., a corporation of Michigan
Filed Jan. 24, 1966, Ser. No. 522,665
7 Claims. (Cl. 312—246)

ABSTRACT OF THE DISCLOSURE

An automobile ash tray is disclosed, in which a slidable tray member is removably connected in a recess of a dashboard member. This is done through the agency of a bearing unit having roller-type anti-friction engagement between said members. The bearing unit has means thereon to release the tray member from it, and from the dashboard member, but remains connected to the latter in any case.

---

The present invention relates to improvements in a pull-out type ash receptacle for automobiles, although it will become evident that the features of the invention are also applicable to other sorts of sliding type structure, particularly one in which a double extension of the sliding member outwardly of a fixed support member is desired.

It is an object of the invention to provide a receptacle or like structure of the kind described, which is, in general, tripartite in character, in that it comprises a support member having means to fixedly connect the same within a vehicle dashboard, or to some other fixed mounting base; a receptacle or like sliding member; and a bearing mounting and retaining unit having roller-type bearing elements receivable in pairs of elongated guide tracks on the respective transversely or laterally opposite sides of the support and sliding members. This bearing mounting and retaining unit serves as an agency for the releasable connection of the sliding receptacle member to the support member in a novel and improved way.

That is, the retaining unit, as disposed within side walls of the support member with its rolling bearing elements on opposite sides thereof engaged in the opposite side tracks of the latter, is restrained from longitudinal separation from the support member in either direction of its rolling movement relative to the latter, preferably by simple struck-out elements on the support member. Thus, the roller mounting and bearing unit in effect becomes a constituent of the support structure, and as such is provided with means for releasably coupling the receptacle member to such structure, enabling the receptacle or sliding member to be removed by itself and alone for the dumping of its content or other purpose.

For this purpose, a releasable latch device is built onto the sliding receptacle member as, in effect, an integral component thereof; and a coacting keeper or detent element is similarly built onto the bearing mounting and retaining unit of the combination. With these elements disengaged from operative holding relation to one another, as by a simple finger movement of the user, the sliding or receptacle member becomes freed for easy longitudinal separation from the support member and the retaining unit which serves as its releasable coupling to the sliding member.

In general, it is an object of the invention to provide an ash receiving or like receptacle or related assembly which is very readily and inexpensively produced, with regard to its component support, retainer and sliding components, of stamped sheet metal parts, and equally economical crimping, riveting and/or welding procedures. The sub-assembly of the bearing unit to the support member insures that it is kept in an enclosed way within the support member, rearwardly of the dashboard in a vehicular installation, hence not subject to possible damage attending withdrawal from and replacement in this environment. By the same token, it is not likely to cause accidental injury to a user attending the sliding manipulation of the receptacle member, both as operatively associated with the support member and in being released and withdrawn from the latter.

The foregoing as well as other objects will become more apparent as this description proceeds, especially when considered in connection with the accompanying drawings illustrating the invention, wherein:

FIG. 1 is a perspective view of the improved receptacle assembly of the invention, showing the sliding receptacle member thereof as withdrawn to a fully extended position relative to the support member;

FIG. 2 is a view in longitudinal vertical section through the center of the assembly, on line 2—2 of FIG. 1, in this withdrawn position;

FIG. 3 is a perspective view of the retainer unit of the receptacle structure, with bearing balls of the latter indicated in dot-dash line;

FIG. 4 is a bracketed view in longitudinal section similar to FIG. 2, showing the sliding receptacle member as released and fully separated from the retainer-support member sub-assembly, as for emptying its content; and FIG. 5 is a fragmentary top plan view of the box or receptacle member of the structure, in particular, the manually releasable spring latch element thereof being shown.

As indicated above, the receptacle structure, generally designated 10, is composed of three main members or units, i.e., a fixed support adapted to be fixedly mounted to an appropriate mount (not shown), such as behind the dashboard or instrument panel of an automobile; a box-like, sliding receptacle member 14 guided for longitudinal, double extension and retractive action within the support member 12; and a bearing mounting and retaining unit 16 (FIG. 3), which releasably couples sliding member 14 to support member 12, in the manner generally described above.

Receptacle member 14 comprises an open-topped box or tray 17 having upright side walls 18, an upright rear wall 19 and a forward wall 20 unitarily and rigidly united, as at the forward and rear ends thereof by 90° bending, crimping and, preferably, spot welding in a known manner, not deemed necessary for detailed illustration. The forward box wall 20 is masked by a rectangular escutcheon panel 22 which is shaped cross sectionally in contour to blend with surrounding zones of the instrument or dash panel (not shown) when the receptacle 10 is in closed condition. Otherwise, the side walls 18 are formed or shaped and inwardly bent 90° toward one another to afford snub-out projections 23 at the tops thereof.

Reference being had to FIGS. 1 and 4, it is seen that each of the box side walls 18 is provided, somewhat beneath its upper margin, with an elongated, mildly arcuate track groove 25 indented therein and opening outwardly thereof. These grooves parallel one another on opposite sides of box 14, extending rearwardly from a relatively forward zone at 26, where they are obstructed by an inward shoulder, through the rear end of the wall 18 and rear box wall 19, as at 27. Thus, receptacle member 14, upon release of retaining latch means (to be described) may be fully drawn free of bearing retainer 16 and support member 12, to the position shown in FIG. 4.

The receptacle or box member 17 is completed, as best shown in FIGS. 4 and 5, by a manually releasable spring latch member 29 of a suitable width and length of spring strip steel, although it may be formed unitarily or integrally on the rear wall 19 of the box. This latch member is located centrally in equally spaced relation between the box side walls 18, having a downturned end 30 which is rigidly secured, as by inturned lugs or fingers 31, stamped or struck out from wall 10 and crimped into clamping engagement with the rear spring extension 30. From this extension, latch member 29 has a forwardly extending length 32 to the top of which a pair of nylon frictional restraint plug elements 33 are applied; and forwardly of the latter the spring finger 32 is downwardly offset 90° at 34, thence 90° forwardly at 35, thus providing a finger element which, as shown in FIGS. 1 and 2, projects forwardly of the forward end of support member 12, when receptacle member 14 is fully drawn outwardly. Thus, the user may push mildly downwardly on the spring finger element or extension 35 to depress latch member 29 from its normal, upwardly biased or sprung condition, and removed from the support member 12. The freely sprung position of latch member 29 appears in FIG. 4. As indicated above, this latch may be formed as an integral, stamped and forwardly bent extension of the rear box wall 19, thus further decreasing the cost of production. Of course, this presupposes that the metal of the box has a suitable spring quality for the purpose.

The fixed support member 12 of ash receptacle 10 is in the form of a steel stamping providing a sort of housing 37 which is generally of an inverted, U-shaped outline, including a top horizontal panel 38 from which upright side walls 39 depend, the housing being completed by an integral depending, partial-depth rear wall lip 40. The support member side walls 39 are formed to provide inwardly opening guide tracks or grooves 41 through the entire longitudinal front-to-rear extent thereof.

At their forward ends, the track grooves 41 are obstructed by small integral tabs 42 struck in from the side walls 39, which tabs prevent forward separation of the bearing mounting and retainer member or unit 16 from the support 12 of receptacle 10. Tracks 41 open through the rear of walls 39, being here partially obstructed by the depending lip 40. However it is intended that rear movement of the retainer 16 from the fixed support housing structure 37 is actually limited and prevented by a pair of small and integral stop elements 43 staked downwardly from the top panel 38 of the support housing, against which the rear of the unit 16 will have stop engagement.

For the purpose of fixedly mounting support member 12 within the dashboard zone of the automobile, the housing 37 may have its top panel embossed and punched at 45 to receive appropriate securing screws (not shown). Furthermore, it is contemplated that such provisions be supplemented by a transverse stirrup member 46 (FIGS. 1 and 2) of inverted U-shaped outline. This mounting member is punch-riveted at 47 to top housing panel 38, and its forward, downwardly inclined legs 48, outwardly of each side wall 39, are embossed and punched at 49 for the reception of suitable further screw means (not shown) to effect a strong mount of stirrup 46 and support housing 37 to coacting mounting means (not shown).

The bearing mounting and retainer member or unit 16 is also in the form of a sheet metal stamping of inverted U-shaped outline. It has a horizontal top panel 51 extending between parallel depending side walls 52; and between these walls the panel 51 is formed to provide a front-to-rear depression or recess 53 of substantial horizontal width, and of diminishing front-to-rear vertical dimension (FIGS. 3 and 4). In the forward and backward sliding movement of the box or receptacle 17, proper, the nylon elements 33 on its spring latch element 32 frictionally engage upwardly against the formation 53, so as to hold the box in any fully or partially withdrawn or retracted position. An integral depending forward tongue 54, of lesser width than the recess 53, is provided for coaction, in the manner shown in FIGS. 1 and 2, with the downward stop offset 34 of latch member 29, in releasably holding the box 17 against separation from support housing 37.

The retainer unit 16 is provided in each of its side walls 52 with circular openings 56 for the reception of a pair of bearing balls 57 and, as best indicated in FIG. 4, the walls 52 have integral, inwardly struck restraining ears 58 at each opening or hole 56. With the unit 16 preliminarily placed within the housing walls 39, these ears 58 prevent ball bearing 57 from lateral departure from unit 16. As thus positioned, the balls 57 have anti-friction bearing action between the respective pairs of housing and box guide grooves or tracks 41, 25, respectively; and the staked stops 43 are then formed in top housing panel 37 to prevent the rear separation of unit 16 mentioned above.

This completes the assembly of the receptacle structure, following which it is rigidly connected within the dashboard zone by the provisions described above. The assembly of structure 10 provides for a relatively long forward extension of its sliding or receptacle member 17, and ready removal from retainer unit 16 and housing member 12 by a manipulation of the finger extension 35 of latch member 29. The component parts are simple and inexpensively produced by mass stamping and bending provisions. Obviously, appropriate welded or other uniting connections may be made than those specifically referred to.

What I claim as my invention is:

1. An ash receptacle or like structure, comprising a relatively fixed support member having elongated and parallel, transversely spaced guide tracks, a receptacle or like sliding member provided with elongated and parallel guide tracks paralleling those of said support member when said members are operatively assembled to one another, a bearing retaining unit having bearings at transversely spaced sides thereof in anti-friction engagement between the respective pairs of tracks of said support and sliding members, thus mounting the last named member for longitudinal sliding movement relative to the support member, said support member having means to limit said movement and prevent separation of said retaining unit from said support member, and means on said sliding member providing a releasable connection thereof to said support member through the agency of said retaining unit.

2. The structure of claim 1, in which said releasable connection means comprises a resiliently biased latch member having a fixed connection to said sliding member and adapted for releasable latching engagement with said bearing retaining unit.

3. The structure of claim 1, in which said releasable connection means comprises a resiliently biased latch member having a fixed connection to said sliding member adjacent the rear of the latter and extending forwardly thereof for releasable latching engagement with said bearing retaining unit adjacent a forward portion of the latter.

4. The structure of claim 1, in which the motion limiting means is spaced longitudinally of said support member and prevents separation of said retaining unit from the support member in both longitudinal directions.

5. The structure of claim 1, in which the motion limiting means is spaced longitudinally of said support member and prevents separation of said retaining unit from the support member in both longitudinal directions, the tracks of said sliding member opening through the rear thereof to permit separation of the sliding member from said retaining unit and support member upon releasing actuation of said connection means of said sliding member.

6. The structure of claim 3, in which the motion limiting means is spaced longitudinally of said support member and prevents separation of said retaining unit from the support member in both longitudinal directions.

7. The structure of claim 3, in which the motion limiting means is spaced longitudinally of said support member and prevents separation of said retaining unit from the support member in both longitudinal directions, the tracks of said sliding member opening through the rear thereof to permit separation of the sliding member from said retaining unit and support member upon releasing actuation of said latch member of said sliding member.

References Cited

UNITED STATES PATENTS

| | | | |
|---|---|---|---|
| 2,334,925 | 11/1943 | Hendricks | 312—246 |
| 2,548,533 | 4/1951 | Hendricks | 312—246 |
| 3,109,688 | 11/1963 | Middleton | 312—246 |
| 3,285,683 | 11/1966 | Middleton et al. | 312—246 |

CASMIR A. NUNBERG, *Primary Examiner.*